No. 862,253. PATENTED AUG. 6, 1907.
E. W. HUMPHREYS.
WINDOW.
APPLICATION FILED JUNE 21, 1906.
8 SHEETS—SHEET 3.
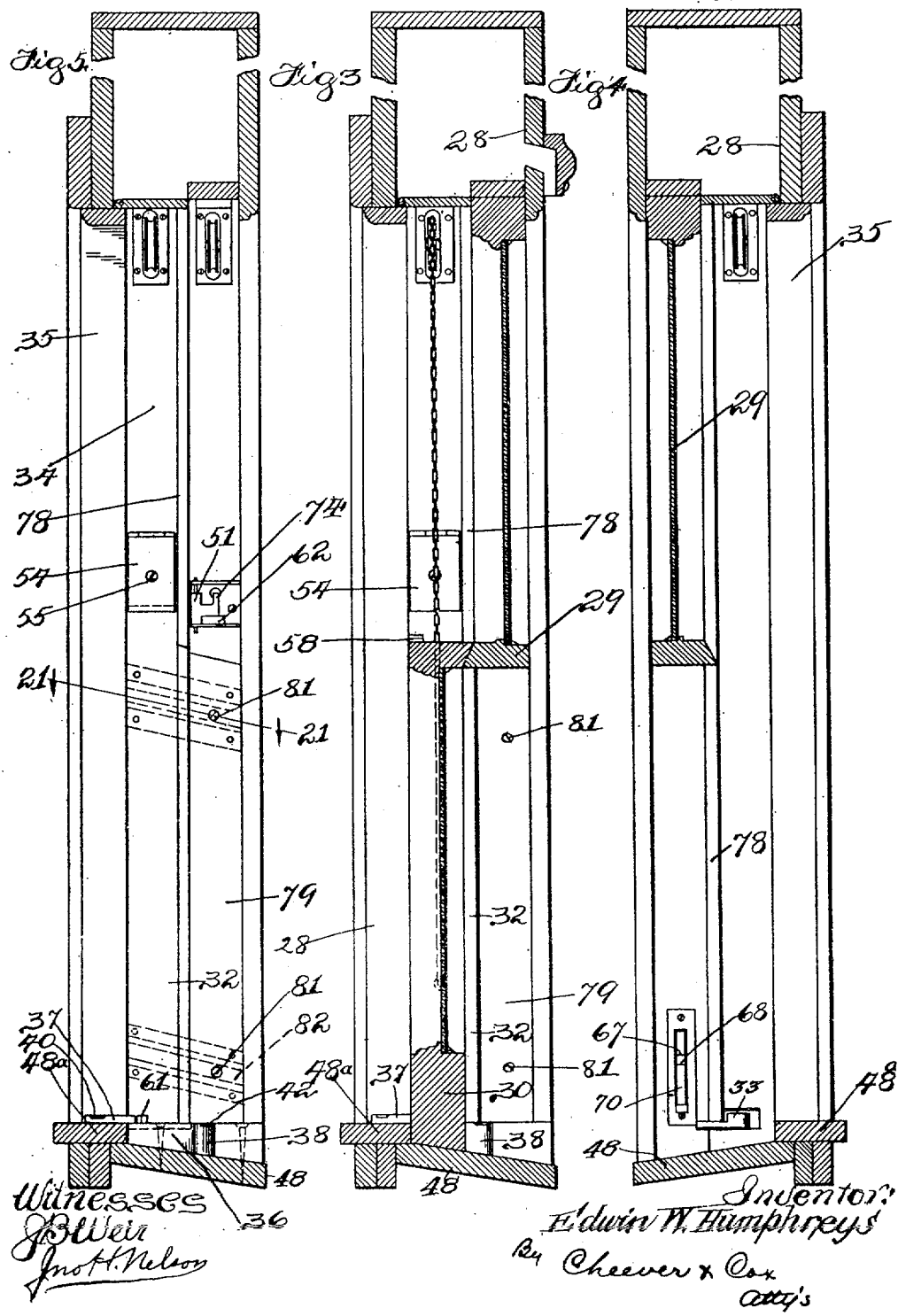
Witnesses
JB Weir
Jno H. Nelson
Inventor:
Edwin W. Humphreys
By Cheever & Cox
Atty's No. 862,253. PATENTED AUG. 6, 1907.
E. W. HUMPHREYS.
WINDOW.
APPLICATION FILED JUNE 21, 1906.
8 SHEETS—SHEET 4.
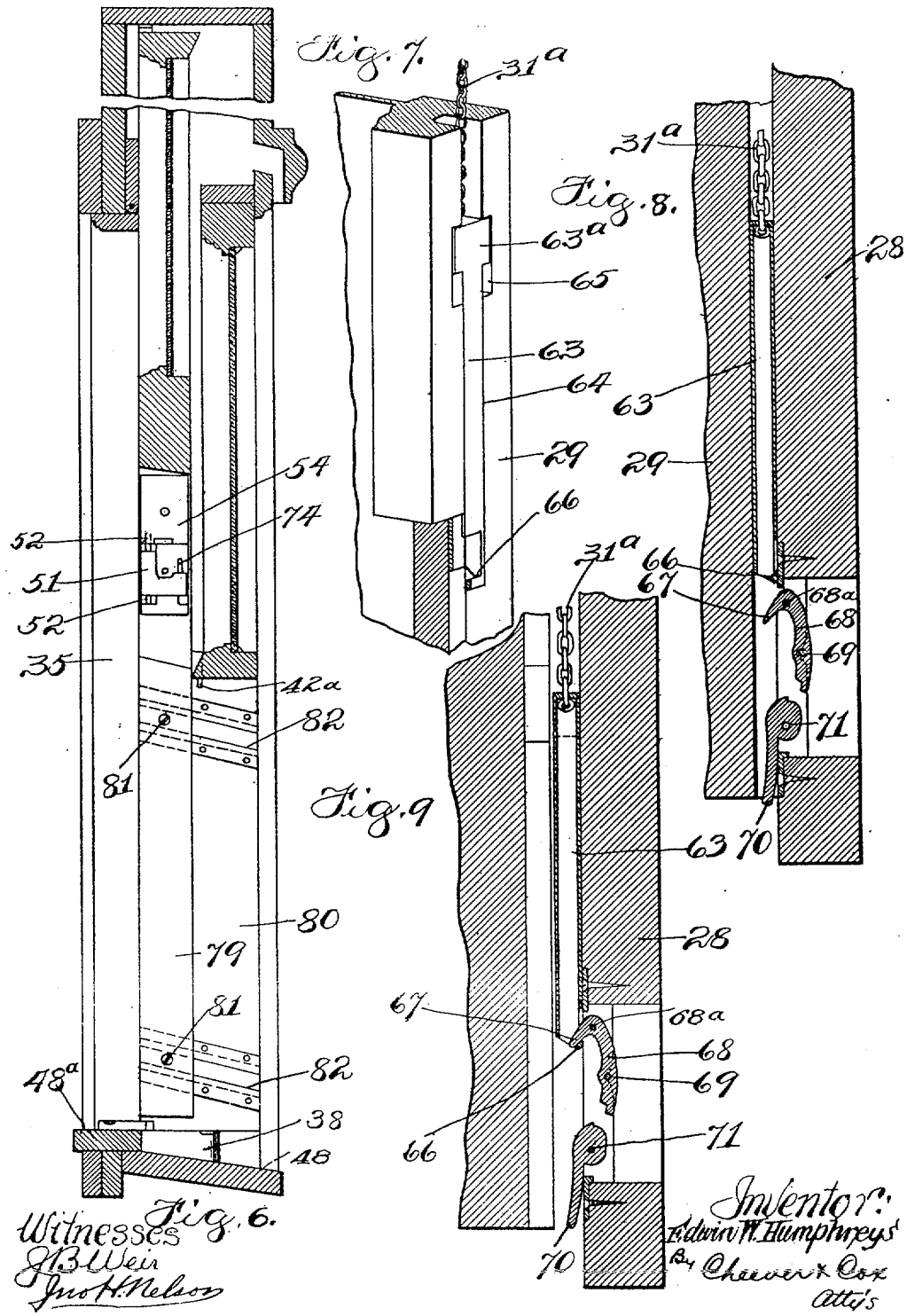

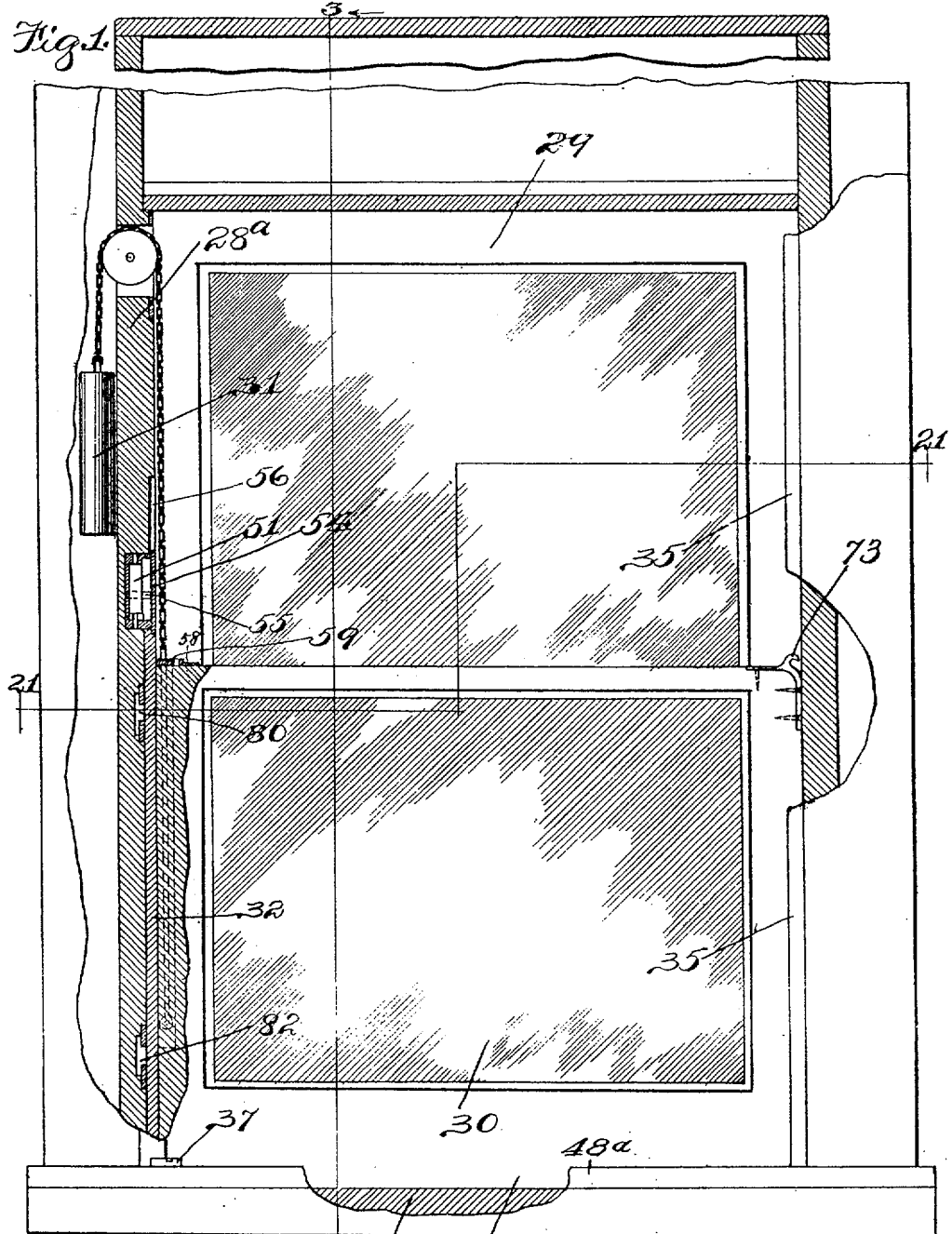

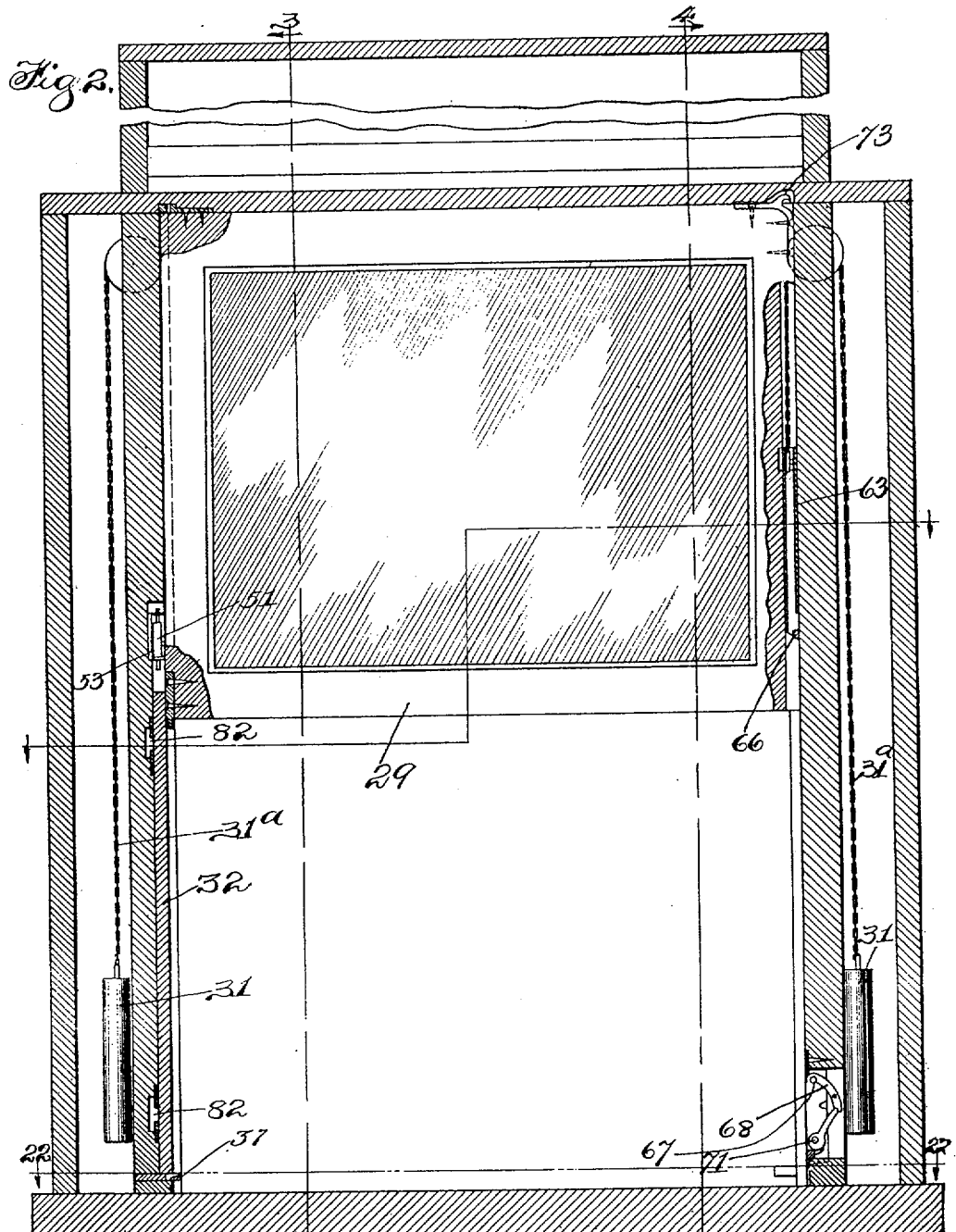

No. 862,253.
PATENTED AUG. 6, 1907.
E. W. HUMPHREYS.
WINDOW.
APPLICATION FILED JUNE 21, 1906.
8 SHEETS—SHEET 5.
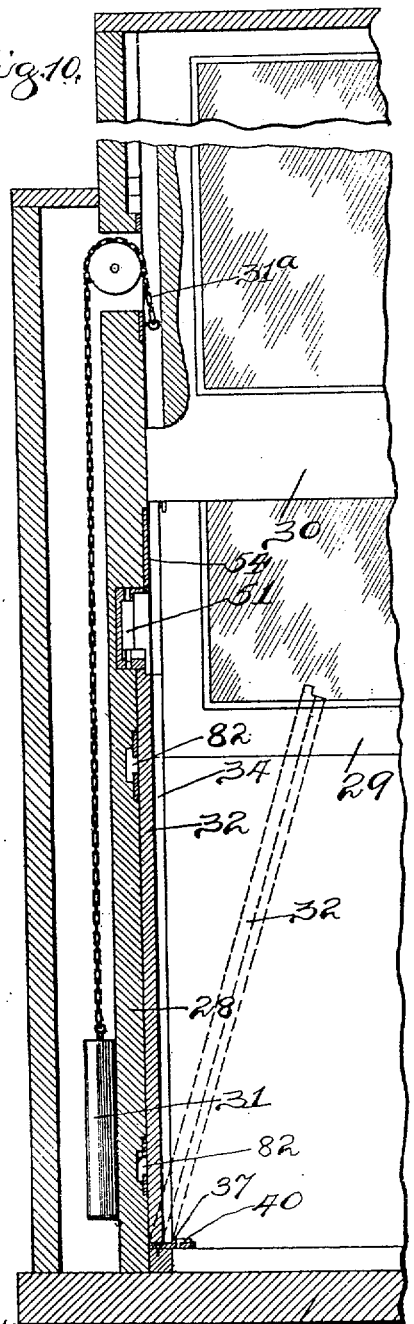
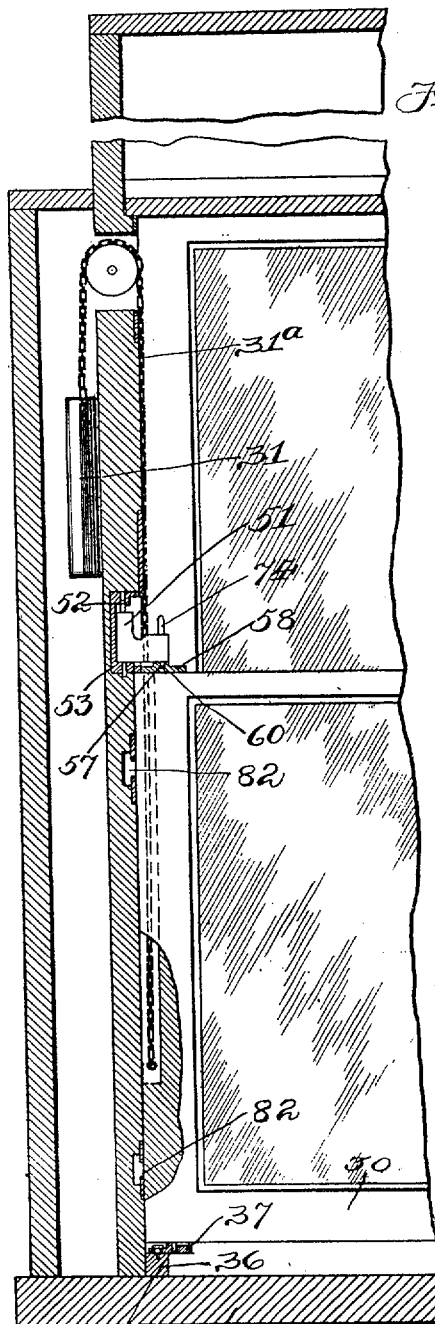

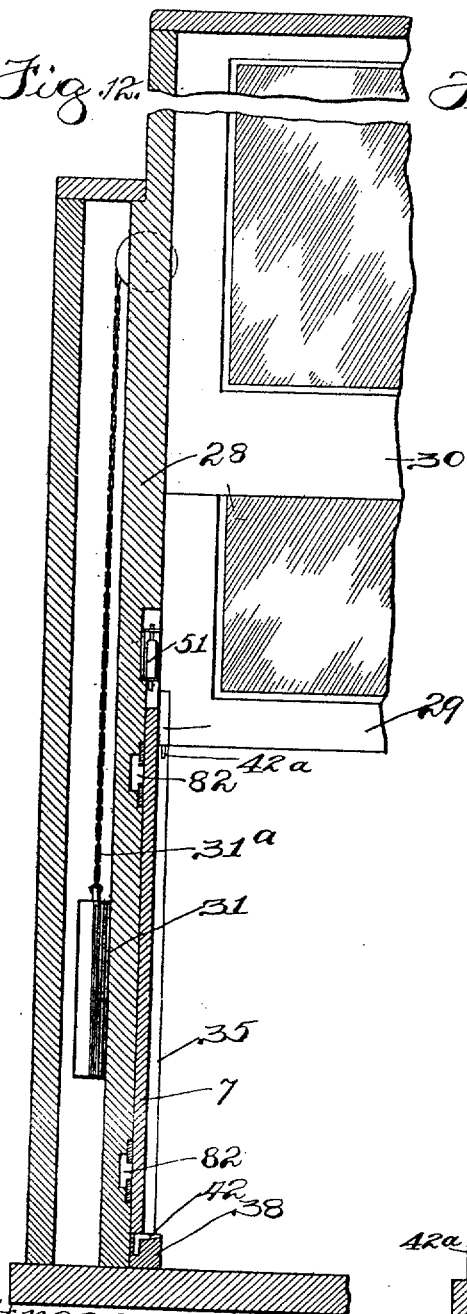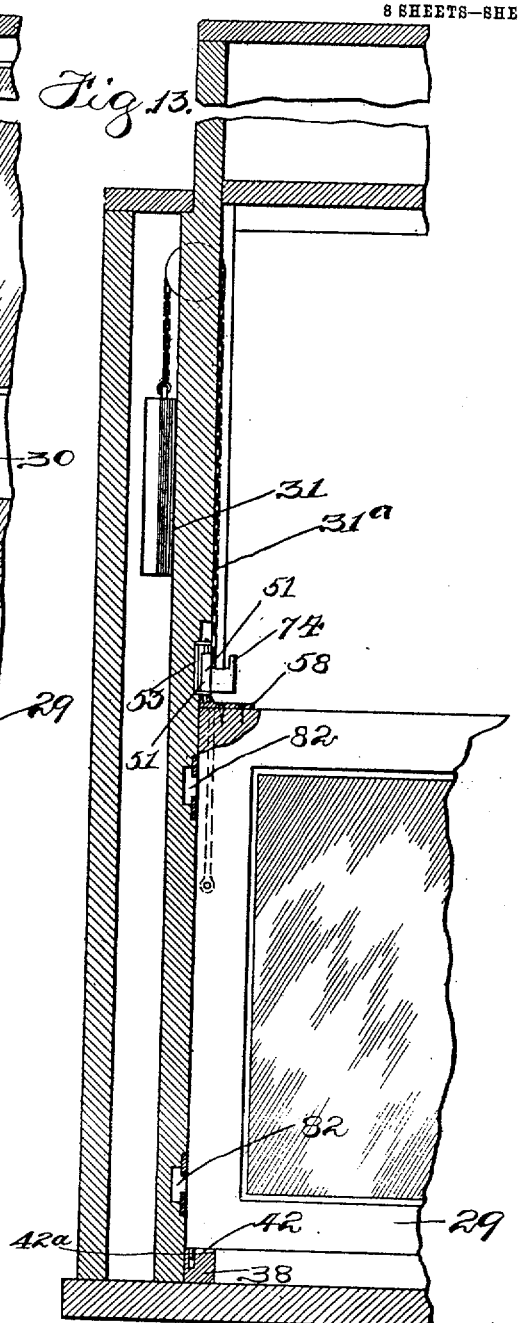

No. 862,253. PATENTED AUG. 6, 1907.
E. W. HUMPHREYS.
WINDOW.
APPLICATION FILED JUNE 21, 1906.
8 SHEETS—SHEET 7.
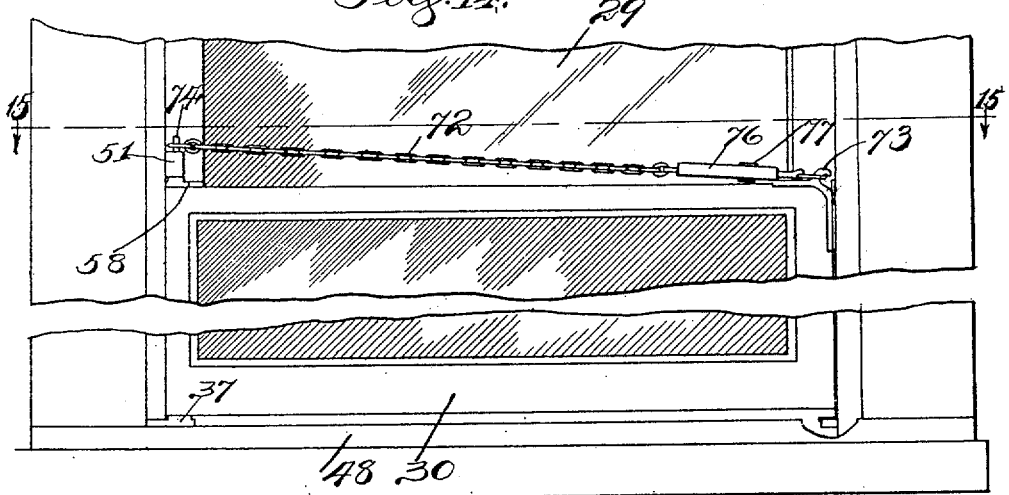
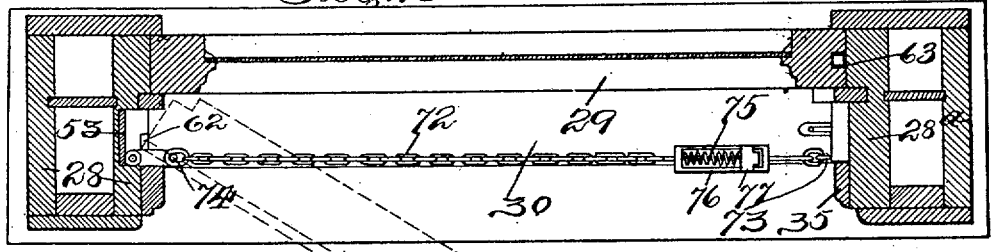
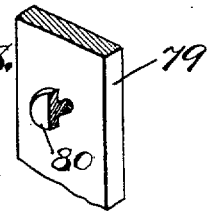
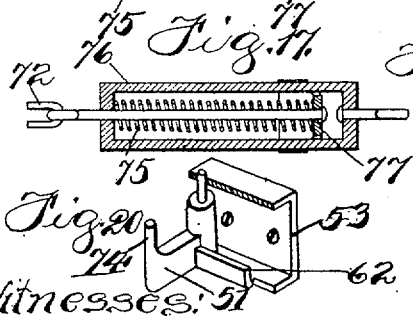
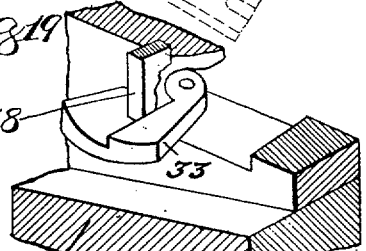
Witnesses:
J. B. Weir
Jno. H. Nelson
Inventor
Edwin W. Humphreys
By Cheever & Cox
Atty's No. 862,253.  
PATENTED AUG. 6, 1907.  
E. W. HUMPHREYS.  
WINDOW.  
APPLICATION FILED JUNE 21, 1906.  
8 SHEETS—SHEET 8.
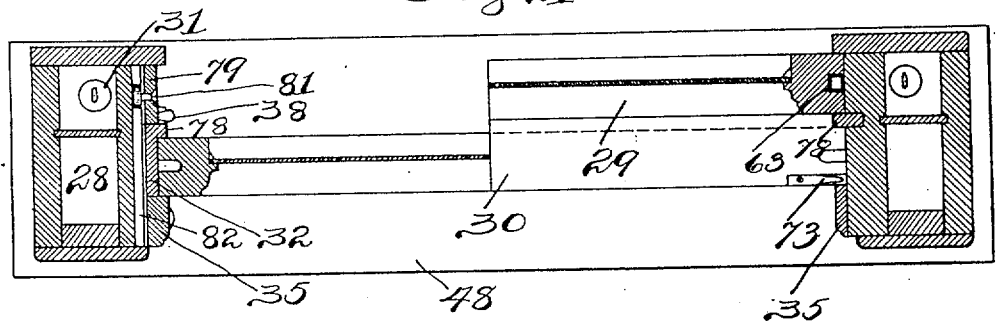
Fig. 21
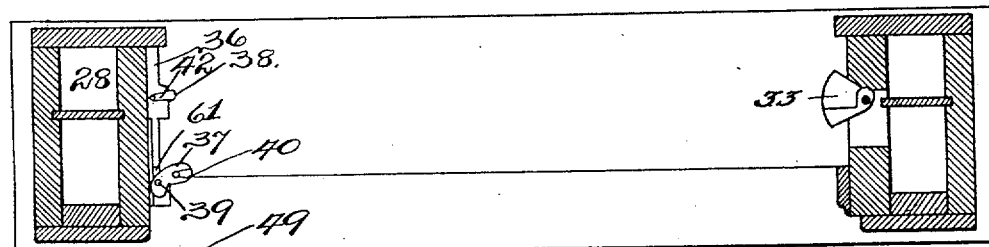
Fig. 22.
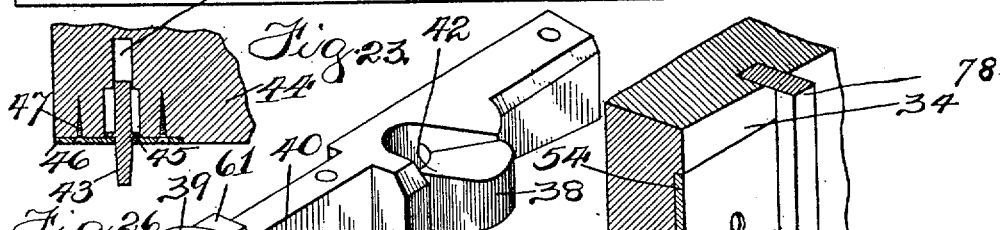
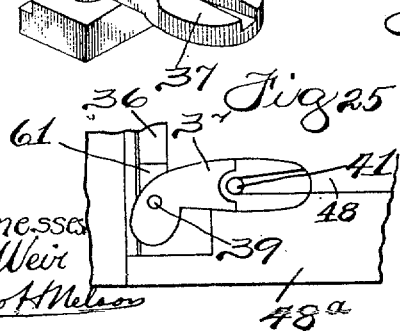

UNITED STATES PATENT OFFICE.

EDWIN W. HUMPHREYS, OF CHICAGO, ILLINOIS.

WINDOW.

No. 862,253.   Specification of Letters Patent.   Patented Aug. 6, 1907.

Application filed June 21, 1906. Serial No. 322,737.

*To all whom it may concern:*

Be it known that I, EDWIN WM. HUMPHREYS, a citizen of the United States, residing at Chicago, in the county of Cook and State of Illinois, have invented a certain new and useful Improvement in Windows, of which the following is a specification.

My invention relates to windows of the class wherein the window sash are vertically movable within the window casing, and are suspended by means of ropes or chains having counter-weights attached thereto.

The object of the invention is to provide means whereby the sash may be swung into the room sufficiently that the outside of the pane may be washed from within the room, thereby obviating the necessity of a window-washer getting upon the outside of the building. In accomplishing this general object, I have provided certain novel features of construction both in the frame and sash and appurtenances thereto, which will be more specifically set out hereinafter in the description and the accompanying claims.

I obtain my objects by the mechanism illustrated in the accompanying drawings, in which Figure 1 is a front elevation of a window-sash or casing, embodying my invention, portions being broken away to reveal certain features of construction; Fig. 2 is a vertical section through the casing showing the lower sash removed and portions of the device broken away to more clearly illustrate features of internal construction; Fig. 3 is a vertical section taken on line 3—3, Fig. 1; Fig. 4 is a vertical section on line 4—4, Fig. 2; Fig. 5 is a sectional view similar to Figs. 3 and 4, but viewed in the opposite direction from Fig. 4 and showing both sashes removed; Fig. 6 is a vertical sectional view, similar to Fig. 3, but showing the lower sash raised to permit the first step in the sequence of manipulation to swing the upper sash into the room;— Fig. 7 is a perspective detail of a portion of the upper sash, showing the terminal block which is fastened to the inner end of the counter-balance chain and is detachably attached to the upper sash; Fig. 8 is a vertical section through the part shown in Fig. 7, and shows said terminal block in position just before engaging its catch on the downward movement of said terminal block and sash; Fig. 9 is similar to Fig. 8, except that the terminal block is shown to be lowered and in engagement with the said catch, but disengaged from the sash; Fig. 10 is a sectional elevation from the front, illustrating the manipulation of some of the parts connected with the lower sash; Fig. 11 is similar to Fig. 10, showing a subsequent step in the operation of the apparatus; Fig. 12 is a front sectional elevation illustrating the first step of manipulation of the upper sash; Fig. 13 is similar to Fig. 12, but shows the parts in a position subsequent to the one there shown; Fig. 14 is a front elevation showing the means for supporting the outer edge of the lower sash when the same is swung free from and unsupported by the casing; Fig. 15 is a plan section on line 15—15, Fig. 14; Fig. 16 is a vertical section of the spring take up device indicated in Fig. 15. Fig. 17 is a plan section taken on line 17—17 Fig. 16; Fig. 18 is a detail perspective of a portion of the removable filler piece. Fig. 19 is a fragmentary perspective view in detail of one of the sash-supporting blocks. Fig. 20 is a detail perspective view of the upper fulcrum device for the upper sash. Fig. 21 is a plan sectional view on line 21—21 Fig. 1. Fig. 22 is a plan sectional view on line 22—22 Fig. 2. Fig. 23 is a vertical section taken through the pivot pin or pintle in the lower portion of the lower sash. Fig. 24 is a detail perspective view partly in section of the pivot device for the upper portion of the lower sash. Fig. 25 is a plan detail view of the pivot device for the lower portion of the lower sash. Fig. 26 is a perspective view showing the preferred construction of the block or blocks which form the pivot for the lower portion of both upper and lower sash.

Similar numerals refer to similar parts throughout the several views.

The window frame or casing 28 portions of which will be hereinafter more specifically referred to, is adapted to receive the vertically movable upper sash 29 and lower sash 30. Counterbalance weights 31 and chains 31ª are provided in the usual manner. An arresting piece 33 (see Figs. 4 and 19) is pivoted to the casing at the right side at such height that the descending window sash will be arrested high enough to swing clear of the window sill 48ª.

One of the objects of the invention is to provide a construction such that the sash when lowered to the bottom of the casing for washing may be shifted sidewise (to the left when viewed as in Figs. 1 and 2 in the present design) thereby freeing the opposite vertical edge of the sash from the vertical stop 35 of the casing to permit said edge of the sash to clear said stop and swing freely (see dotted lines Fig. 15) and into the room consequently rendering it possible to make said stop 35 a permanent part of the casing and not removable as in the usual construction. In order that the sash may be shiftable leftward when it is to be cleaned and yet be non shiftable during the ordinary raising and lowering thereof, a removable stop or filler piece 32 is provided which is adapted to be removably interposed between the casing and the left vertical edge of the sash as best shown in Figs. 1, 2, 10 and 12. This filler piece is in reality a portion of the pulley stile 28ª, and when it is in position, the inner face of the sash channel 34 is continuous, the different parts thereof being flush with each other and permitting the sash to be raised and lowered in the usual manner. Located in the bottom of casing 28 and made a part thereof by being fixed thereto is the lower fulcrum block 36. This block is provided with two fulcrum pieces 37 and 38. Fulcrum piece 37 is pivoted at 39 to the block 36 and is also provided with an inwardly extending slot 40 reaching to the fulcrum point 41 shown in Fig. 25. The block 36 at the fulcrum point 38 is also provided with an inwardly extending tapering slot 42. The object of these tapering slots is to guide the fulcrum points upon which the bottoms of the sashes swing. The lower fulcrum of the sash 30 is illustrated in Fig. 23 and consists of a loose pin 43 which takes into the frame 44 of the sash 30 and is retained therein by the flange 45 on pin 43, the whole being held in place by a plate 46 secured to the sash 44 by means of the screws 47 or otherwise. When the sash 30 is in the normal position as shown in Fig. 1 the sash 44 rests upon the base plate 48 of the frame 27, the pin or lower fulcrum point 33 receding into the pocket 49. The fulcrum point 42$^a$ on the bottom of the upper sash is located in position to enter slot 42 when said sash is lowered.

Located above the lower sash 30 in the sash way 34 is the upper fulcrum member 51 to which the upper part of the sash is fulcrumed. This fulcrum member 51 is more clearly illustrated in Fig. 24 of the drawings in which position it is shown engaging the sash 30. This fulcrum member consists of a block 51 pivoted by means of pins 52 in a box frame 53 secured in the casing 28 in the sash way 34. There is some vertical play of said block in said box frame for lowering its pin into sash block 58, shown in Figs. 13, 14 and 24. The said box frame 53 has a cover 54 which is long enough when lowered and locked in position by screw 55 to engage the upper end of filler piece 32 and hold it from outward movement. The window casing is recessed at 56 to receive the cover 54 when the same is turned up and back as shown in Figs. 10 and 24. When sash 30 is about to be swung inwardly as shown in dotted lines Fig. 15 it is first raised a sufficient distance to allow the fulcrum block 37 to be swung around its pivot 39 (see Figs. 22, 25 and 26) until the slot 40 comes into line beneath the pin 43. The filler piece 32 having been previously removed, the sash is shifted laterally until the pin 43 enters the fulcrum point 41. The pivot block 51 is then rotated to the position shown in Fig. 24 when the fulcrum pin 57 on said block will be in a position to drop into the fulcrum block 58 on the top of sash 30. This block 58 is also provided with a slotted guide way 59 (see Fig. 1) for guiding the fulcrum point 60. For the operation of swinging the window inward as illustrated in dotted lines Fig. 15 it becomes necessary to make the fulcrum point stationary, and to accomplish this I secure on the fulcrum block 36 a stop 61 which limits the backward swing of the pivoted block 37. When the fulcrum pin 43 enters the fulcrum point 41 of block 37 it passes through and extends far enough to engage the window sill 48$^a$. Thus said sill 48$^a$ and the stop 61 hold the fulcrum point 43 rigidly in position so that the sash 30 may be freely swung about them as an axis. The upper sash 29 is operated in an analogous manner, the fulcrum point 42$^a$ entering slot 42 to pivot the lower edge of the sash. The upper edge is pivoted by means of the lower pin 52 of the vertically movable block 51 (see Figs. 13 and 20) entering the plate 58 on the upper edge of said upper sash 29. This last adjustment is made by hand after the sash is lowered and moved bodily forward into the sashway of the lower sash. The pivot block 51 is locked from rotation by being dropped down onto the base of the box 53 as shown in Figs. 20 and 24. In this position it is interposed between the end walls of said box and the projecting portion 62 of said box.

In order to hold the counter weight on the right side of the casing from dropping when the sash is disengaged from the weight chain 31$^a$ I provide a removable terminal block 63 having a head 63$^a$, the whole being adapted to be received in a recess 64 in the right edge of the sash. The upper portion 65 of said slot is longer than the head 63 and is arranged vertically so that a limited vertical movement of said block in the sash is permitted. No fastening device is necessary to retain said terminal block in position on the sash, the block being held between the edges of the sash and the adjacent sashway 34.

At the lower extremity of block 63 is a bar 66 which is adapted to be engaged by the nose 67 of the catch 68 best shown in Figs. 2, 8 and 9. Said catch is pivoted at the point 68$^a$ and is overbalanced in such manner that unless otherwise influenced by an external agency it tends to assume the position shown in Fig. 8. The catch is prevented from rotating too far in a clockwise direction by means of a pin 69 extending from the side of the catch in position to contact an adjacent portion of the casing 28 as shown in Figs. 8 and 9. In this position the nose 67 is in the path of the downwardly moving bar 66 and will be thrown back by said bar until after the bar has passed below said nose, at which time said catch will swing back again and, as soon as the sash and contained terminal block are slightly raised said nose 67 will engage bar 68 and prevent said block from further upward movement. The attached weight 31 is therefore retained in suspended position. If now while the nose 67 of catch 68 is in engagement with the bar 66 of said terminal block 63 the sash be raised slightly it will free the sash from head 63$^a$, and, said block being retained by said catch, the lateral (leftward) movement of the sash into the space normally occupied by filler piece 32 will cause the disengagement of the sash from the terminal block. In other words, the terminal block being held fast by catch 68 will remain behind while the sash is shifted away from it.

The sash will be therefore disengaged from said terminal block and the recessed edge of said sash will not only clear said terminal block but will also clear the vertical stop 35 of the casing 28.

It is obvious that under normal operation of the window it would be undesirable to have catch 68 engage the block 62. In order therefore to prevent such engagement a dog 70 pivoted on the pin 71 is mounted in casing 28 in such position as to engage catch 68 and hold it back out of engagement with bar 66 except when said catch is rotated to non operative position shown in Figs. 8 and 9.

In order to support the outer edge of the sash when they are swung into the room, I provide a tension member 72 consisting preferably of a chain as shown in Figs. 14 and 15, one end of said chain being adapted to be connected to the hook plate 73 at the outer upper edge of said sash and to the pin 74 on pivot block 51 as best shown in Figs. 14, 20 and 24. A suitable take-up device for keeping the chain taut when in action is illustrated in Figs. 14 to 17 wherein a spring 75 is interposed between one end of a casing 76 and a plunger 77 slidable therein. One end of said tension member 72 is connected to said plunger and the other to said casing in such manner that the resilience of the spring tends to keep the tension member 72 taut.

The method of providing a space in the casing into which the sash may be laterally shifted so as to swing clear of the stop 35 and parting stop 78 makes it necessary to provide a filler piece for the upper as well as the lower sash. The location and construction of this piece is best indicated in Figs. 5 and 6 wherein there is shown a filler piece 79 adapted normally to rest in the sash way 80 at the rear of the casing in line with the upper sash 29. Preferably said rear filler piece 79 is not absolutely removable from the casing but is merely shiftable to the front of the casing out of the way of the upper sash. The most advantageous construction is well indicated in Figs. 5 and 6 wherein it is shown that said filler piece 79 is provided with two guide pins or screws 81, 81, which slide in the somewhat inclined guideways 82, 82 at the left side of casing 28. Of course the upper (and rear) sash 29 will never be swung forward unless the lower sash is either swung forward or entirely removed and therefore the filler piece 79 need never interfere with the front filler piece 32. The advantage in having the rear filler piece slidable is that it may be quickly manipulated and no time need be lost in taking it out and putting it back into the casing.

Although the operation of the device has been already indicated it may be again briefly outlined as follows: Let it be assumed that all the parts are in the position usually occupied by them during the normal operation of raising and lowering the sash. When it is desired to swing the sash inwardly in the room for cleaning or other purpose the cover 54 is first swung up to the position shown in Fig. 24. This releases the upper extremity of filler piece 32 although it remains in position by reason of the presence of the lower sash. The lower sash is then raised high enough to permit the said filler piece to be taken out as indicated in dotted lines Fig. 10. The sash will also be high enough to afford access to the dog 70 to permit it to be released from catch 68 so that said catch may assume the position shown in Fig. 8. The sash is then lowered and also shifted leftward until the pintle 43 rests in slot 40 of block 37, said block having been swung to a point beneath the sash while the sash was raised. As the sash is lowered onto block 37 catch 68 engages the terminal block 62 and holds it fast. While the sash is thus in lowered position the upper fulcrum member 50 is swung out to the position shown in Fig. 24 and lowered so that its pin 57 engages the block 58 on the top of the lower sash. The sash is thus now hinged top and bottom, and as it has been shifted leftward its right edge is now free of terminal block 62 and stop 35. The tension member 72 is then attached in position, one end to the hook plate 73 and the other to the pin 74. The sash is then free to be swung into the room. The manipulation of the upper sash is practically the same as the manipulation of the lower sash with the few exceptions noted in the description above.

What I claim as new and desire to secure by Letters Patent, is:

1. In combination a window casing, two vertically movable sashes and two filler pieces in the casing, one removably mounted at the side of the forward sash and the other normally occupying a space at the side of the rear sash behind the removable filler piece, the second filler piece being adapted to slide forward clear of the rear sash when the first filler piece is removed.

2. In combination a window casing, a front and a rear sash vertically movable therein, vertical stops in said casing in front of said sashes to guide the same, a removable forward filler piece in the casing at the side of the forward sash which when removed permits the forward sash to be shifted sidewise into the casing to thereby enable the opposite vertical edge of the sash to clear its stop when being swung inwardly, and a rear filler piece in the casing at the side of the rear sash and behind the forward filler piece and adapted to be slid forward into the space normally occupied by the forward filler piece for permitting the rear sash when lowered to be shifted laterally so it may be swung inwardly.

3. In combination a window casing, including a pulley stile, sashes vertically movable in the casing, permanent vertical stops on the casing in front of the sashes to guide the same, a removable forward filler piece in the casing at the side of the forward sash said filler piece constituting a part of the pulley stile, the space occupied by the removable filler piece being sufficient to receive the edge of the sash and permit sidewise motion thereof to enable the sash to swing clear of its stop, and a second filler piece back of the first adapted to slide forward in the casing out of the way of the rear sash, for permitting the rear sash also to swing clear of its stop.

4. In combination a casing; a sash vertically movable therein; pivoting means for the bottom of the sash; a sash block on the top of the sash in line above the pivoting means on the bottom thereof, a fulcrum block 51 adapted to engage said sash block to act as a pivot therefor; and a box frame let into said casing, said fulcrum block being pivoted to said box frame so as to swing about a vertical axis in order to be swung either into said frame and out of the way of the sash, or out over the top of the sash, and said fulcrum block being vertically adjustable in said box frame so that it may be lowered into engagement with said sash block.

5. In combination a casing; a sash vertically movable therein; pivoting means for the bottom of the sash; a sash block on the top of the sash in line above the pivoting means on the bottom thereof, a fulcrum block pivoted to the casing and adapted to engage said sash block to act as a pivot therefor, a chain or cord for suspending the edge of said sash, and a pin 74 on said fulcrum block whereto said chain or cord may be attached.

In witness whereof, I have hereunto subscribed my name in the presence of two witnesses.

EDWIN W. HUMPHREYS.

Witnesses:
HOWARD M. COX,
CLARA J. CHRISTOFFEL.